March 24, 1953  H. L. POTTER  2,632,677
DUPLEX BEARING
Filed May 13, 1947

INVENTOR.
HOWELL L. POTTER

BY *Mitchell Bechert*

ATTORNEYS.

Patented Mar. 24, 1953

2,632,677

UNITED STATES PATENT OFFICE 2,632,677

DUPLEX BEARING

Howell L. Potter, New Britain, Conn., assignor to
The Fafnir Bearing Company, New Britain,
Conn., a corporation of Connecticut Application May 13, 1947, Serial No. 747,623

7 Claims. (Cl. 308—194)

My invention relates to bearings, and in particular to antifriction bearings of the so-called duplex type.

It is an object of my invention to provide an improved bearing of the character indicated.

It is another object to provide an improved antifriction bearing comprising duplex elements in which, under conditions of combined radial-and-thrust loads, one of said elements may tend to sustain substantially the entire radial component of the load, while the other of said elements may tend to sustain substantially the entire thrust component.

It is also an object to provide an improved duplex construction in which under combined radial and thrust loads the radial load may be sustained by one element while the thrust load is sustained by the other, and in which the function of segregating these load components may obtain regardless of the direction in which the thrust load is applied.

It is a further object to obtain the above objects in a self aligning bearing.

Other objects and various further features of the invention will be pointed out or will occur to those skilled in the art from a reading of the following specification in conjunction with the accompanying drawings. In said drawings.

Figure 1:
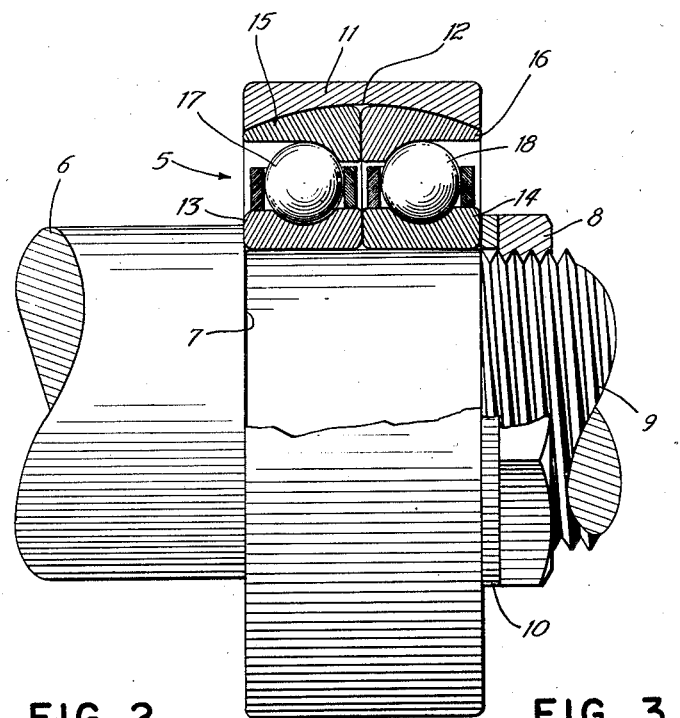
Fig. 1 is a side elevational view, partly in section, showing a shaft-mounted bearing incorporating features of the invention.

Briefly stated, my invention in a preferred form contemplates a bearing construction in which duplex antifriction bearings may be mounted within a circumferentially extending seat. For a first direction of thrust a first shoulder on the seat may engage principally only one of the bearings of the duplex arrangement, but the arrangement is such that under these conditions one of the bearings may serve to take substantially all the thrust load while the other assumes substantially all the radial load. If a similar shoulder is provided to engage the other bearing, then, under conditions of reversed thrust, the radial and thrust components of the load may again be segregated and substantially independently assumed by respective elements of the duplex arrangement. In the form to be described, the shoulders on the seat are formed at the circumferentially extending lips of a generally spherical surface which is engaged by generally spherical outer surfaces on the outer rings of the duplex bearing elements.

Referring to the drawings, my invention is shown in application to a so-called duplex bearing 5 mounted on a shaft 6. In the form shown, the inner rings of the duplex bearing 5 are rigidly clamped against a shoulder 7 on the shaft 6 by means of a nut 8 engaging a threaded end 9 of the shaft 6. A washer 10 is interposed between the nut 8 and the bearing assembly 5. For self-alignment purposes, the bearing assembly 5 may be carried in a seat member 11 having a concave generally spherical seating surface 12 formed therein.

In accordance with a feature of the invention, the antifriction bearings or halves of the duplex assembly 5 are mounted back to back and are preferably angular-contact bearings which may have a certain radial looseness before assembly into the duplex relationship. It will later be clear that the angle of contact or degree of radial looseness may be largely determined by the loads to be assumed by the bearing.

Each of the bearings of the duplex assembly 5 may comprise an inner ring 13—14, and outer ring 15—16 and a plurality of antifriction bearing elements 17—18 between said rings. The design of raceways for the antifriction bearing element 17—18 preferably is such that, for no load or for a purely radial load on the entire bearing assembly, each of the duplex bearings 5 may be preloaded to assume both radial and thrust loads. In the form shown, the antifriction bearing elements 17 of one of the bearings 5 are balls, which, in the case of a purely radial load, may be said to transmit forces between the inner and outer bearing rings 13—15 substantially along the inclined line 19 of Fig. 2. In like manner, the antifriction elements 18 of the other duplex bearing 5 may be balls cooperating with the raceways of inner and outer rings 14—16 to transmit forces substantially along the inclined line 20 of Fig. 2. Thus, for the condition of no axial or thrust load on the bearing assembly as a whole, forces may be shared equally by both halves of the duplex bearing; under these circumstances, the suspension forces may be symmetrically assumed, as shown schematically by the inclined lines 19—20.

In order to effect the symmetry of suspension forces as described above, the raceways on the inner rings 13—14 may be formed with curvatures of radii slightly exceeding that of the antifriction elements 17—18, and the outer raceways on rings 15—16 may be similarly formed with curvatures of radii exceeding that of the antifriction elements 17—18. Thus, when the bearing assembly is mounted as shown in Fig. 1, with the nut 8 squeezing both inner rings 13—14 against the shoulder 7, there may be an inner clearance 21 and an inner clearance 22 between the balls 17—18 and the inner raceway lips or edges on rings 13—14, and these clearances 21—22, while equal, may exceed the outer clearances 23—24 at the outer lips or edges of the raceways on rings 13—14. In like manner, it will be understood that there may be clearances 25—26 between the balls 17—18 and the inner lips or edges of the outer raceways in rings 15—16.

In accordance with a feature of the invention, the outer bearing rings 15—16 may be formed with outer generally spherical surfaces 27—28, preferably of the same geometric sphere when mounted side by side. However, the nature of this sphere with respect to the generally spherical surface 12 on the seat 11 is such that, while there are, in effect, two radial and thrust-receiving shoulders 29—30 on the seat 11 in contact with and therefore supporting each of the rings 15—16, there is a certain central radial clearance between the rings and the seat; this clearance is given the general designation 31. Stated in other words, the rings 15—16 may have outer spherical surfaces, while the seating surface 12 may be called oblate spherical or vice versa.

Figure 2:
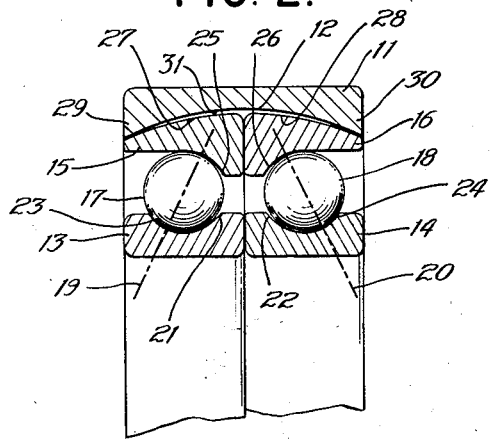
Fig. 2 is a fragmentary sectional view of the arrangement of Fig. 1 schematically showing, by means of disproportionately exaggerated dimensions, a first functioning according to the invention.
Figure 3:
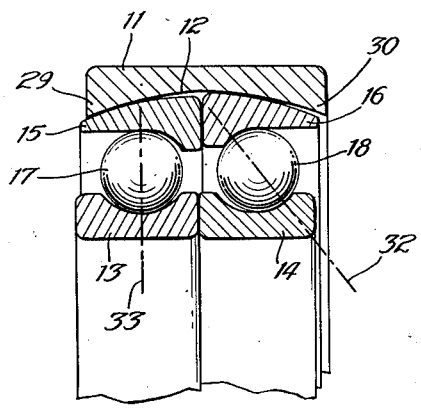
Fig. 3 is a view similar to Fig. 2 but showing a second functioning according to the invention.

Referring perticularly to Figs. 2 and 3, it will be seen that the structure which has been described may be effective, in the presence of combined radial and thrust loads, to permit assumption of substantially only radial components of the load by one half of the duplex bearing 5, and of substantially only thrust components of the load by the other half of duplex bearing 5. Let it be assumed, for example, that in addition to a radial load there is a thrust load acting in a right-to-left direction (in the sense of Fig. 3), that is, a thrust by the shaft 6 tends to displace the bearing assembly 5 to the left with respect to its seat or mounting 11. Under such conditions, it is clear that the nut and washer 8—10 may bodily displace the inner rings 13—14 to the left and that, while the entire duplex bearing assembly 5 tends to be carried by the inner rings 13—14, the inherent elasticity of the materials causes or permits some distortion of the assembled relationship of parts.

The first noticeable effect of the displacement to the left of inner rings 13—14 is a reduction of clearances 21—24 between the balls 17—18 and the inner rings 13—14. Displacement of the outer rings 15—16 to the left is resisted by abutment of the outer ring 15 with the shoulder 29, so that the tendency is also to reduce the clearance 26 between the balls 18 and the outer ring 16. With clearances 24—26 reduced as above indicated, it will be understood that the balls 18 may ride nearer the lips or edges of their raceways and that, therefore, the line or force transmission between the inner and outer rings 14—16 may be inclined at a steeper angle, as indicated schematically at 32.

In the process of assuming the steeper contact line 32, it will be understood that clearance 31 between the outer ring 16 and the generally spherical seat surface 12 may permit a slight radially outward expansion of the ring 16, and that with sufficient clearance 31 there may be essentially no central contact of the ring 16 upon the seat 12. At the same time, the leftward displacement of ring 16 with respect to the seat 12 will be understood to have substantially unseated the ring 16 from the shoulder 30. As a result, it is clear that the bearing comprising rings 14—16 may sustain substantially no radial load under the described conditions of thrust to the left. At the same time, thrust will be understood to be transmitted from the inner ring 14 to the outer ring 16, via the line 32 through balls 18, and thence through the outer ring 15 to the left shoulder 29 on the seat or mounting 11.

Consider now the case of the other or left half of bearing 5 comprising rings 13—15 and balls 17. The leftward displacement of the inner rings 13—14 will be understod to have reduced the inner clearance 21 and to have increased the outer clearance 23, so that both these clearances may approach equality. At the same time, the clearance 25 of ball 17 with the outer ring 15 will have been increased so that the line 33 of force transmission through the balls 17 may become substantially purely radial. It will be understood that under properly designed conditions of initial radial looseness in the respective halves of bearing 5 a full thrusting load may cause the force line 33 to be purely radial. Under such circumstances, the radial load will be assumed wholly by the left half of the bearing 5—the radial forces being transmitted from the ring 13 to the ring 15, via the line 33 through balls 17, and thence radially outward through the shoulder 29 on the seat or mounting 11.

Due to the symmetry of design which characterizes the described structure, it will be appreciated that the functioning which has been described for a right-to-left thrust component may apply equally well for conditions of left-to-right thrust. In the latter event, the right half of the bearing assembly 5 would tend to assume the radial component of the load, while the left half may assume the entire thrust.

It will be appreciated that I have described a unique and relatively simple arrangement wherein a duplex bearing may be utilized to segregate radial and thrust components of the load regardless of the direction of thrust. In the embodiment shown and described in detail this feature is applied to a bearing of the self-aligning type, and it is clear that self-alignment functions need not be impaired by the added functions permitted by my invention.

Although specifically described in application to duplex bearings, it will be understood that the principles of the invention may be applied to other types of bearings, including, for example, an assembly utilizing but one double-raceway inner ring and two abutting outer rings. Moreover, bearings utilizing antifriction elements other than balls may be employed. It will further be understood that modifications may be made within the scope of the invention as defined in the appended claims.

I claim:

1. In a bearing assembly of the character indicated, a pair of antifriction bearings each including an inner ring and an outer ring and antifriction elements therebetween, each of said rings including a partly radially extending thrust-supporting race surface on diametrically opposite sides of said antifriction elements, the line of contact of said surfaces with an antifriction element of one bearing being inclined oppositely to the line of contact of said surfaces with an antifriction element of the other bearing, and seat means including a first camming portion contacting the outer ring of one of said bearings at the axially outer portion thereof and a second camming portion contacting the outer ring of the other of said bearings at the axially outer portion thereof, there being a radial clearance between said outer rings and said seat means at points intermediate the contacted parts of said camming portions.

2. In a bearing assembly of the character indicated, a pair of opposed angular-contact antifriction bearings having contact angles normally opposed and converging radially outwardly of said assembly in a thrust-preloaded relationship, the outer rings of said bearings being formed with generally spherical surfaces, and seat means for said bearings and including spaced circumferential shoulder means engaging said seating surfaces of said bearings near the axially outer limits thereof in the absence of an asymmetrical axial load, said seat means being also radially spaced from said seating surfaces of said bearings near the axially inner limits thereof in the absence of an asymmetrical axial load.

3. In a bearing assembly of the character indicated, inner-ring means including two ball raceways of generally arcuate section and means holding a given longitudinal spacing of the centers of said raceways, a set of balls in each of said raceways, two outer bearing rings with ball raceways of generally arcuate section and having centers longitudinally spaced less than said given spacing when said rings are in longitudinal abutment, whereby normally said sets of balls may be preloaded with opposed angles of contact converging radially outwardly so as to hold said outer bearing rings in longitudinal abutment, said outer bearing rings having abutting end faces in a substantially radial plane, whereby said outer bearing rings may radially expand and contract relatively to each other while in longitudinal abutment, the outer surfaces of said outer bearing rings being oppositely tapered to converge toward the bearing axis beyond the longitudinal ends of said assembly, and seat means extending circumferentially of both said outer bearing rings and having a bore with concave tapering surfaces to engage said first-mentioned tapering surfaces, there being axially between said concave surfaces a circumferentially extending radial clearance between said seat means and said outer bearing rings, said radial clearance exceeding the corresponding clearance between said seat means and said outer bearing rings at the axially outer effective limits thereof, whereby upon an axial thrust of said holding means relatively to said seat means one set of balls may receive the substantial part of the thrust with an increased contact angle directed toward the outer bearing ring for the other set, the thrust being then directly transmitted to said seat means while relieving thrust on said other set.

4. A bearing assembly according to claim 3, in which said tapering surfaces are generally spherical so that said assembly may be self-aligning.

5. A bearing assembly according to claim 3, in which said radial clearance is of a magnitude which will permit radial abutment of one of said outer rings with the central part of said seat means upon expansion of said one outer ring in the presence of an asymmetrical axial load 6. A bearing assembly according to claim 5, in which said radial abutment occurs when the contact angle of the balls in the other of said outer rings is substantially zero, whereby one of said sets of balls may sustain the substantial part of the thrust component of the load and the other set of balls may sustain the substantial part of the radial component of the load.

7. In a bearing assembly of the character indicated, a pair of angular-contact bearings each comprising an inner ring, an outer ring, and anti-friction bearing elements therebetween, the contact angles of said bearings being normally opposed and converging radially outwardly of said assembly in a thrust-preloaded relationship, a seat member having a generally spherical concave surface and the outer rings of said bearings being formed with generally spherical convex surfaces to engage said seat surface, said concave surface in an axial section being of sharper curvature than said convex surfaces, whereby a predominant radial clearance may be defined between said concave and convex surfaces where said outer bearing rings are closest to each other, for the purpose described.

HOWELL L. POTTER.

REFERENCES CITED

The following references are of record in the file of this patent:

UNITED STATES PATENTS

| Number | Name | Date |
|---|---|---|
| 1,259,222 | Forsberg | Mar. 12, 1918 |
| 1,262,208 | Kelly | Apr 9, 1918 |
| 1,430,319 | Parker | Sept. 26, 1922 |
| 1,467,378 | Hanson | Sept. 11, 1923 |
| 1,656,970 | Bantin | Jan. 24, 1928 |
| 2,157,101 | Smith | May 9, 1939 |

FOREIGN PATENTS

| Number | Country | Date |
|---|---|---|
| 302,790 | Italy | Nov. 8, 1932 |

OTHER REFERENCES

Delaval-Crow: "Progress in Preloading," American Machinist, October 2, 1930; pages 545–546. (Copies in 308/189.1 Div. 45 and in Scientific Library.)